(12) United States Patent
Das Purkayastha et al.

(10) Patent No.: US 11,789,858 B2
(45) Date of Patent: Oct. 17, 2023

(54) METHOD AND SYSTEM FOR PERFORMING READ/WRITE OPERATION WITHIN A COMPUTING SYSTEM HOSTING NON-VOLATILE MEMORY

(71) Applicant: Samsung Electronics Co., Ltd., Suwon-si (KR)

(72) Inventors: Saugata Das Purkayastha, Bangalore (IN); Suresh Vishnoi, Bangalore (IN)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 254 days.

(21) Appl. No.: 17/060,686

(22) Filed: Oct. 1, 2020

(65) Prior Publication Data

US 2022/0050770 A1    Feb. 17, 2022

(30) Foreign Application Priority Data

Aug. 11, 2020   (IN) .............................. 202041034500

(51) Int. Cl.
| | | |
|---|---|---|
| G06F 12/084 | (2016.01) | |
| G06F 12/02 | (2006.01) | |
| G06F 12/0804 | (2016.01) | |
| G06F 12/1081 | (2016.01) | |
| G06F 13/16 | (2006.01) | |
| G06F 13/42 | (2006.01) | |
| G06F 12/0891 | (2016.01) | |

(52) U.S. Cl.
CPC ........ *G06F 12/0238* (2013.01); *G06F 12/084* (2013.01); *G06F 12/0804* (2013.01); *G06F 12/0891* (2013.01); *G06F 12/1081* (2013.01); *G06F 13/1673* (2013.01); *G06F 13/4221* (2013.01); *G06F 2213/0026* (2013.01)

(58) Field of Classification Search
CPC ..................................................... G06F 12/0238
USPC .......................................................... 711/154
See application file for complete search history.

(56) References Cited

U.S. PATENT DOCUMENTS

| | | | | |
|---|---|---|---|---|
| 5,493,652 | A * | 2/1996 | Koufopavlou | ........ G06F 12/023 |
| | | | | 711/170 |
| 5,682,522 | A * | 10/1997 | Huang | ................... G09G 5/363 |
| | | | | 345/542 |
| 6,161,169 | A * | 12/2000 | Cheng | ................... G06F 3/0656 |
| | | | | 711/151 |
| 6,704,316 | B1 * | 3/2004 | He | ....................... H04L 47/2433 |
| | | | | 709/218 |
| 9,563,382 | B2 | 2/2017 | Hahn et al. | |
| 10,007,433 | B2 | 6/2018 | Hahn | |

(Continued)

*Primary Examiner* — Titus Wong
(74) *Attorney, Agent, or Firm* — Harness, Dickey & Pierce, P.L.C.

(57) ABSTRACT

A method for performing a write operation includes selecting, by a host, at least a free write buffer from a plurality of write buffers of a shared memory buffer (SMB) by accessing a cache structure within the SMB for tracking the free write buffer; sending, by the host, at least a logical address accessed from the cache structure with respect to the selected write buffer to issue a write-command to a non-volatile memory; receiving a locking instruction of the selected write buffer from the non-volatile memory; updating a status of the selected write buffer within the cache structure based on the received locking instruction; and allowing the non-volatile memory to extract contents of one or more locked write buffers including the selected write buffer.

15 Claims, 10 Drawing Sheets

(56) References Cited

U.S. PATENT DOCUMENTS

| | | | |
|---|---|---|---|
| 10,268,584 B2 | 4/2019 | Hahn | |
| 2003/0196042 A1* | 10/2003 | Hopeman | G06F 12/121 |
| | | | 711/E12.07 |
| 2004/0090976 A1* | 5/2004 | Shung | H04L 49/108 |
| | | | 370/386 |
| 2010/0246275 A1* | 9/2010 | Aybay | H04L 45/00 |
| | | | 711/147 |
| 2010/0250699 A1* | 9/2010 | Brown | H04L 49/9047 |
| | | | 709/213 |
| 2016/0274797 A1* | 9/2016 | Hahn | G06F 3/0679 |
| 2017/0351452 A1 | 12/2017 | Boyd et al. | |

* cited by examiner

METHOD AND SYSTEM FOR PERFORMING READ/WRITE OPERATION WITHIN A COMPUTING SYSTEM HOSTING NON-VOLATILE MEMORY

CROSS-REFERENCE TO RELATED APPLICATION

This application claims the benefit of Indian Patent Application No. 202041034500 filed on Aug. 11, 2020, in the Indian Intellectual Property Office, the disclosure of which is incorporated herein in its entirety by reference.

1. FIELD

At least some example embodiments of the inventive concepts relate to a memory device and, in-particular, to a solid state storage devices (SSD).

2. RELATED ART

Storage modules, such as solid state drives (SSDs), typically use generalized models to determine optimized write and read patterns by host computing-system. When the host-behavior matches such expected patterns, the best-level of performance, endurance, and power consumption is exhibited by the storage-module. Storage modules that can adapt their storage-algorithms with an actual rather than expected host-behavior sees improved synergy with the host, resulting in better performance, endurance, and/or power consumption, as desired.

A host memory buffer or HMB is a feature supported by SSDs (e.g. defined by NVMe 1.2 onwards), wherein a portion of host-memory of a host computing-system is exposed over a peripheral interface-connector (PCIe) to the SSD. The client SSD utilizes this connector-feature to store a portion of L2P (logical to physical mapping) table and writes into buffers of the HMB instead of writing into an inbuilt-DRAM of the SSD. The SSD utilizing this HMB feature may DRAM less, which helps reduce both the cost and power requirement and is usable for low-power and mobile device such as tablets and smartphones.

Figure 1:
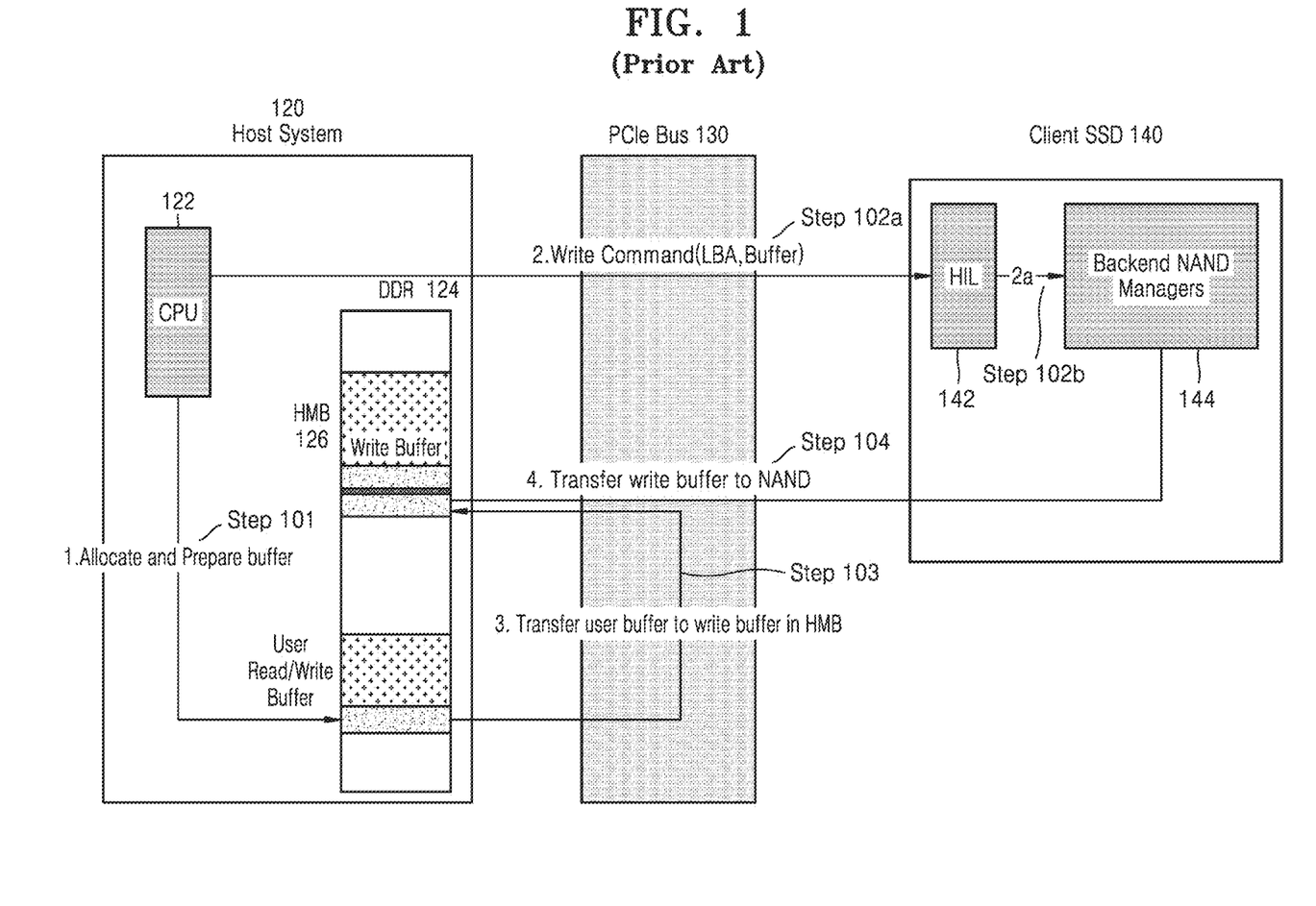
FIG. 1 illustrates a state of the art write transfer from host memory buffer (HMB) with respect to a solid state drive (SSD).

A host-system using the HMB based client SSD incurs an overhead of "two transfers" over PCIe during write from host buffer to the SSD or NAND memory. FIG. 1 depicts a state of the art write transfer from an HMB 126 and illustrates the underlying flow of steps 101 to step 104 as follows:

As is illustrated in FIG. 1, a host system 120 includes a processor 122 (e.g., a central processing unit (CPU)), and a memory 124 (e.g., a double data rate (DDR) dynamic random access memory (DRAM)). Further, the memory 124 includes an HMB 126. The host system 120 may be connected to a solid state drive (SSD) 140 via a peripheral component interconnect express (PCIe) bus 130. The SSD 140 may include a host interface logic (HIL) 142 and backend NAND managers 144. When an application in a host-system 120 wants to write to SSD, it first allocates buffer in the HMB 126 via step 101 and writes data into the buffer. The HIL 142 and backend NAND managers 144 may each be embodied by a circuit or circuitry.

The Application then passes the buffer via step 102a to underlying-file system or an NVMe driver (executed by the processor) to transfer data to SSD. In an example, while host system 120 might have multiple layers of buffer copy, the present example of FIG. 1 assumes a write-through or direct-I/O kind of system where there is no additional buffer copy from application to driver.

The NVMe driver of the host then issues write-command to the SSD through a logical-block address (LBA) and buffer-pointers. SSD typically has one module referred as host interface logic (HIL) 142 responsible for handling NVMe commands and another layer for backend NAND management. The HIL 142 holds the incoming write data in a pool of write buffers till it gets written to the NAND or SSD.

On receiving the write command, the HIL allocates write buffer in the HMB 126 via step 102a and transfers the data from user buffer to the HMB 126 write buffer, thereby completing the write-command via step 103

At a later point via step 104, when a NAND programmable unit of data has got accumulated in write buffers (typically 48K or 96K), the backend NAND manager 144 forming a part of the SSD 140 fetches the write buffers from the HMB 126 and programs it to NAND. Once programming is done, write buffers are freed.

As may be seen from the FIG. 1, during step 103 and step 104, the buffer or HMB 126 gets transferred twice via PCIe bus 130, once to the HMB 126 and other time from the HMB 126 to NAND memory of the SSD 140, thereby incurring a writing overhead.

Figure 2:
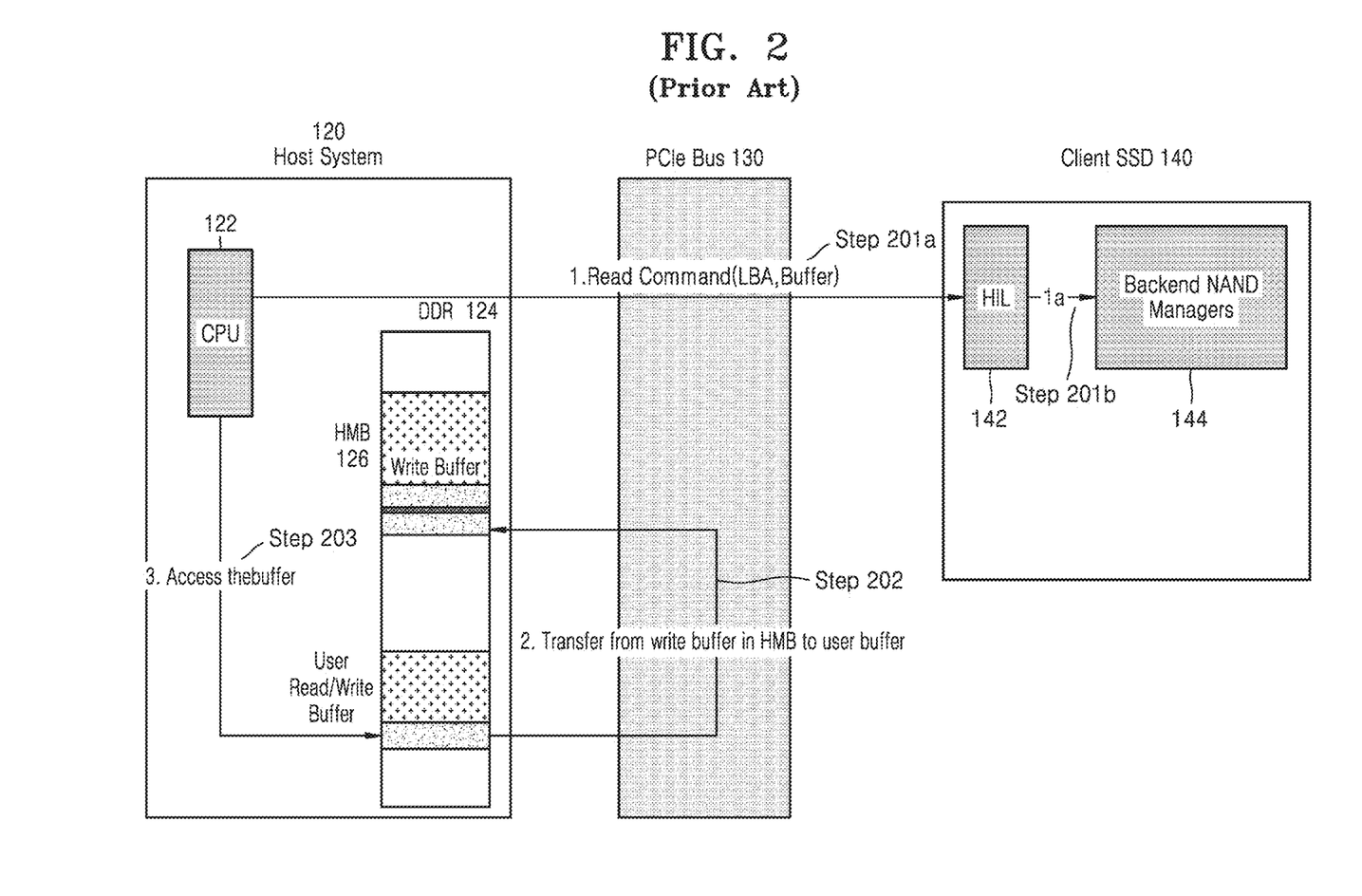
FIG. 2 illustrates a state of the art read transfer from an HMB with respect to an SSD.

FIG. 2 depicts a state of the art "Read transfer" from HMB 126 and illustrates the underlying flow of steps 201 to step 203 as follows:

When an application wants to read, it allocates buffer and issues read to NVMe driver via step 201a. NVMe-driver in turn issues the read to the SSD 140 on a given logical block address (LBA) and buffer pointers.

On receiving the read command, HIL will check via step 201b if the requested LBA is already available in write buffers. In state of the art SSD systems, this check may be done by backend NAND manager based on the L2P entry for that LBA.

If the requested LBA is in write buffers of the HMB 126, then the data is transferred over the PCIe bus 120 from the HMB 126 to user read buffer via step 202.

If the requested LBA is not in the write buffer then the read-request is translated into a NAND read request and transferred from the NAND memory of the SSD 140 to a user read buffer by the backend NAND manager 144.

Once the data is transferred to the user-read buffer, the read is completed and application can access the data from the read buffer via step 203.

As seen from the FIG. 2 here, the data has to be necessarily transferred over the PCIe bus 130 through the step 202, even though the "buffer or HMB" was available in the DDR memory 120 or HMB 126 of the host-system 120.

SUMMARY

According to at least some example embodiments of the inventive concepts, a method for performing a write operation includes selecting, by a host, at least a free write buffer from a plurality of write buffers of a shared memory buffer (SMB) by accessing a cache structure within the SMB for tracking the free write buffer; sending, by the host, at least a logical address accessed from the cache structure with respect to the selected write buffer to issue a write-command to a non-volatile memory; receiving a locking instruction of the selected write buffer from the non-volatile memory; updating a status of the selected write buffer within the cache structure based on the received locking instruction; and allowing the non-volatile memory to extract contents of one or more locked write buffers including the selected write buffer.

According to at least some example embodiments of the inventive concepts, a method for performing a read operation includes detecting, by a host, a logical address in at least one write buffer of a shared memory buffer (SMB) based on a cache structure within the SMB; and allowing a direct access of the SMB by the host for transferring data from the at least one write buffer to an allocated read buffer to thereby enable a read operation defined by an internal data-transfer within the SMB.

According to at least some example embodiments of the inventive concepts, a computing-system hosting a client device including a non-volatile memory includes a shared memory buffer including a plurality of write buffers configured to accumulate data for the non-volatile memory; and a cache structure within a shared memory buffer (SMB) for tracking a free write buffer out of the plurality of write buffers within the SMB; and processing circuitry configured to select, at least a free buffer from the plurality of write buffers of the SMB by accessing a cache structure within the SMB; and send at least a logical address accessed from the cache structure with respect to the selected write buffer to issue a write-command to the non-volatile memory; receive a locking instruction of the selected write buffer from the non-volatile memory and thereby updating status of the selected write buffer within the cache structure; and allow the non-volatile memory to extract contents of one or more locked write buffers including the selected write buffer.

According to at least some example embodiments of the inventive concepts, a computing system hosting a client device defined by a non-volatile memory includes a shared memory buffer including a plurality of write buffers configured to accumulate data for a non-volatile memory; and a cache structure within a shared memory buffer (SMB) configured to track a free write buffer out of the plurality of write buffers within the SMB; and processing circuitry, the processing circuitry configured to detect, a logical address in at least one write buffer of the SMB based on a cache structure within the SMB, allocate a read buffer within the SMB, and allow a direct access of the SMB by an application for internally transferring data from the at least one write buffer to the allocated read buffer within the SMB to thereby enable a read operation.

BRIEF DESCRIPTION OF FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of at least some example embodiments of the inventive concepts. Furthermore, in terms of the construction of the device, one or more components of the device may have been represented in the drawings by conventional symbols, and the drawings may show only those specific details that are pertinent to understanding at least some example embodiments of the inventive concepts so as not to obscure the drawings with details that will be readily apparent to those of ordinary skill in the art having benefit of the description herein.

DETAILED DESCRIPTION

For the purpose of promoting an understanding of the principles of at least some example embodiments of the inventive concepts, reference will now be made to the embodiment illustrated in the drawings and specific language will be used to describe the same. It will nevertheless be understood that no limitation in scopes of at least some example embodiments of the inventive concepts is thereby intended, such alterations and further modifications in the illustrated system, and such further applications of principles of at least some example embodiments of the inventive concepts as illustrated therein being contemplated as would normally occur to one skilled in the art to which at least some example embodiments of the inventive concepts relate.

It will be understood by those skilled in the art that the foregoing general description and the following detailed description are explanatory of at least some example embodiments of the inventive concepts and are not intended to be restrictive thereof.

Reference throughout this specification to "an aspect", "another aspect" or similar language means that a particular feature, structure, or characteristic described in connection with the embodiment is included in at least one example embodiment of the inventive concepts. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which at least some example embodiments of the inventive concepts belong. The system, methods, and examples provided herein are illustrative only and not intended to be limiting.

Figure 3:
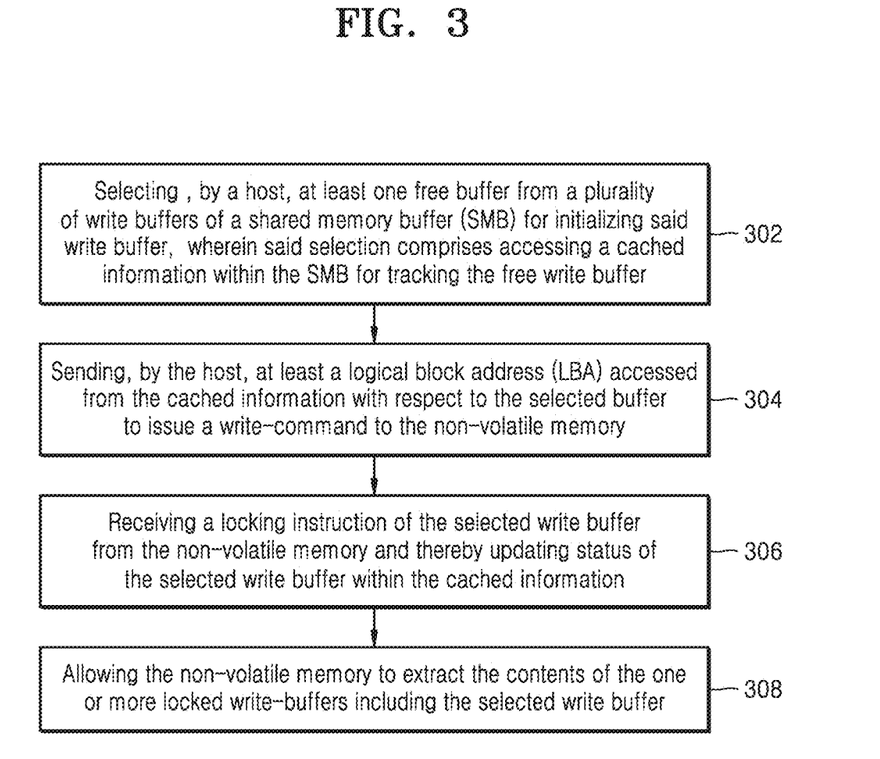
FIG. 3 illustrates a method of operation, in accordance with at least one example embodiment of the inventive concepts.

At least some example embodiments of the inventive concepts will be described below in detail with reference to the accompanying drawings:

FIG. 3 illustrates a method of operation in accordance with at least one example embodiment of the inventive concepts. The method refers to a method for performing a write operation within a computing system hosting a client device defined by a non-volatile memory.

The method comprises selecting, by a host, at least one free buffer from a plurality of write buffers of a shared memory buffer (SMB) for initializing said write buffer, wherein said selection comprises accessing a cached information within the SMB for tracking the free write buffer. According to at least one example embodiment of the inventive concepts, the cached information is a data structure for tracking a logical address of data and status within the write buffers. The data structure may include an entry for each write buffer defined as a logical block address (LBA) of the data currently in the write buffer, and locked or unlocked state of the write buffer. However, as a precursor to step 302, a base address and size of the cached information or cached data structure associated with the SMB is registered by the host-device with the non-volatile memory.

The method further comprises sending (step 304), by the host, at least a logical block address (LBA) accessed from the cached information with respect to the selected buffer to issue a write-command to the non-volatile memory. In response thereto, a locking instruction of the selected write buffer is received (step 306) from the non-volatile memory, and thereby the status of the selected write buffer is updated within the cached information.

According to at least one example embodiment of the inventive concepts, prior to locking of the selected buffer, a controller associated with the non-volatile memory checks a quantum or amount of accumulated data in the write buffers for scheduling the extraction of the data from the plurality of write buffers including the selected buffer into the non-volatile memory.

The method further comprises allowing (step 308) the non-volatile memory to extract the contents of the one or more locked write buffers including the selected write buffer. Such extraction of the contents of the one or more locked write buffers by the non-volatile memory corresponds to a single step transfer of data to the non-volatile memory from the SMB across PCIe. Thereafter, the cached information is re-updated to unlock the selected write buffer for further usage subsequent to completion of said extraction. Such re-updating comprises marking the logical address of data as invalid as a part of unlocking the selected write buffer.

Figure 4:
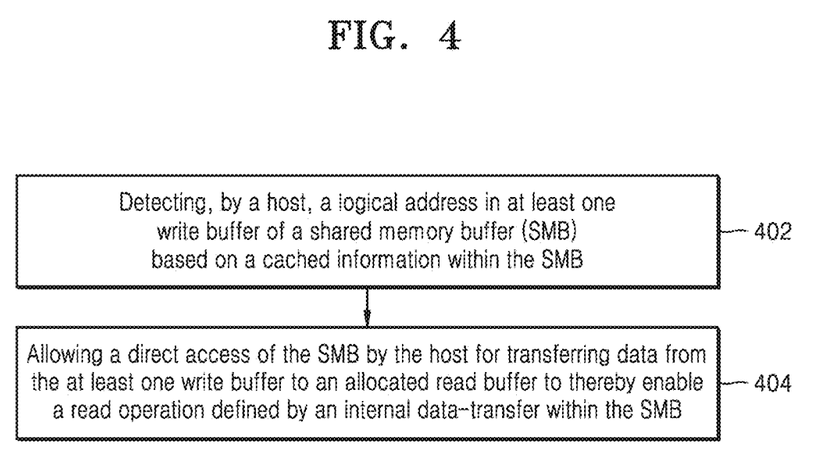
FIG. 4 illustrates another method of operation, in accordance with at least one example embodiment of the inventive concepts.

FIG. 4 illustrates a method of operation in accordance with another embodiment of the present subject matter. The method refers to a method for performing a read operation within a computing system hosting a client device defined by a non-volatile memory.

The method comprises detecting (step 402), by a host, a logical address in at least one write buffer of a shared memory buffer (SMB) based on cached information within the SMB. Further, in case of non-availability of the logical address in said at-least one write buffer, the read command is issued from the host to the non-volatile memory Thereafter, the method comprises allowing (step 904) a direct access of the SMB by the host for transferring data from the at least one write buffer to an allocated read buffer to thereby enabling a read operation defined by an internal data-transfer within the SMB. Such access of the SMB is access of a main memory defined by an internal direct memory access (DMA) operation without requiring a data-transfer across the PCIe.

Figure 5:
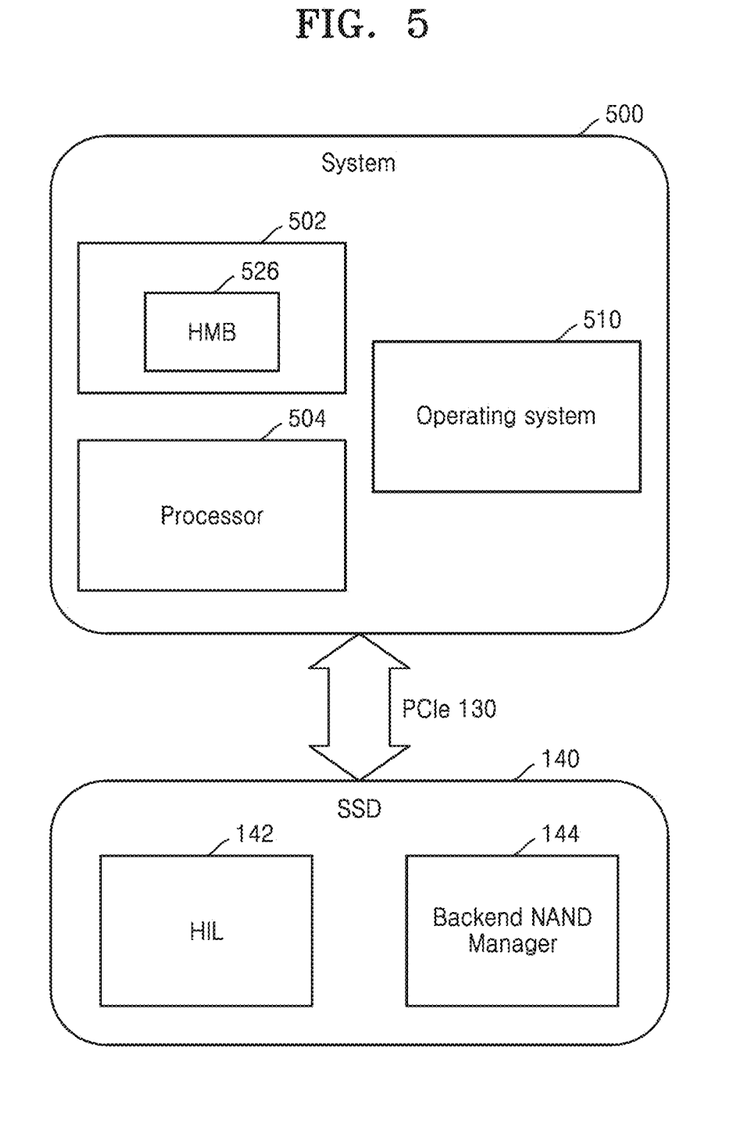
FIG. 5 illustrates a system, in accordance with at least one example embodiment of the inventive concepts.

FIG. 5 illustrates a detailed internal-construction of a system 500 hosting a client-device as SSD 140, in accordance with at least one example embodiment of the inventive concepts. The system 500 includes a memory 502 and a processor 504 to execute the method steps 302 to 308 of FIG. 3 and the method steps 402 to 404 of FIG. 4. The processor 504 may be processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

Likewise, there may be a peripheral card interface such as a PCIe, Serial-ATA (SATA), or any other interface that facilitate operational-interconnection between the storage module and the host computing system 500. In the example illustrated in FIG. 5, the PCIe bus 300 is connected between the host computing system 500 and the SSD 140. While the SSD 140 is removably-connected to the host 500 through PCIe, it may also be integrated with the chipset of the host-computing system. The SSD 140 may also be referred to in the present specification as the non-volatile memory 140. The SSD 140 may include a controller. The controlled of the SSD 140 may control an overall operation of the SSD 140 and one or more elements of the SSD 140. The controller of the SSD 140 may be processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The system (500) hosts a client device defined by a non-volatile memory (SSD). The client device may include a memory 502 that includes a shared memory buffer (SMB) comprising a plurality of write buffers for accumulating data for a non-volatile memory, and a cached information within the SMB for tracking a free write buffer out of the plurality of write buffers within the SMB. According to at least some example embodiments, the SMB may be embodied by an HMB 526 in the memory 502, as is discussed in further detail below with reference to FIG. 6A. Alternatively, the SMB may be embodied by a controller memory buffer (CMB) in the SSD 140, as is discussed in further detail below with reference to FIG. 6B. According to at least some example embodiments, the memory 502 may be embodied by, for example, a double data rate (DDR) dynamic random access memory (DRAM).

The system 500 may also include a processor 504 that is configured for accessing the cached information within the SMB by selecting at-least one free buffer from the plurality of write buffers of the shared memory buffer (SMB) for initializing said write buffer. At-least a logical address (LBA) is accessed from the cached information with respect to the selected buffer to issue a write-command to the non-volatile memory 140. A 'locking' instruction for the selected write buffer is received from the non-volatile memory 140, thereby updating status of the selected write buffer within the cached information. The non-volatile memory 140 is allowed to extract the contents of the one or more locked write buffers including the selected write buffer.

According to at least one example embodiment of the inventive concepts, the cached information is a data structure for tracking logical address of data and status within the write buffers. The data structure comprises an entry for each write buffer defined as a logical block address (LBA) of the data currently in the write buffer, and locked or unlocked state of the write buffer.

Further, a controller (i.e. NAND manager) is associated with the non-volatile memory 140 for checking a quantum or amount of accumulated data in the write buffers, prior to locking the selected buffer, for scheduling the extraction of the data from the plurality of write buffers including the selected buffer into the non-volatile memory.

Figure 6A:
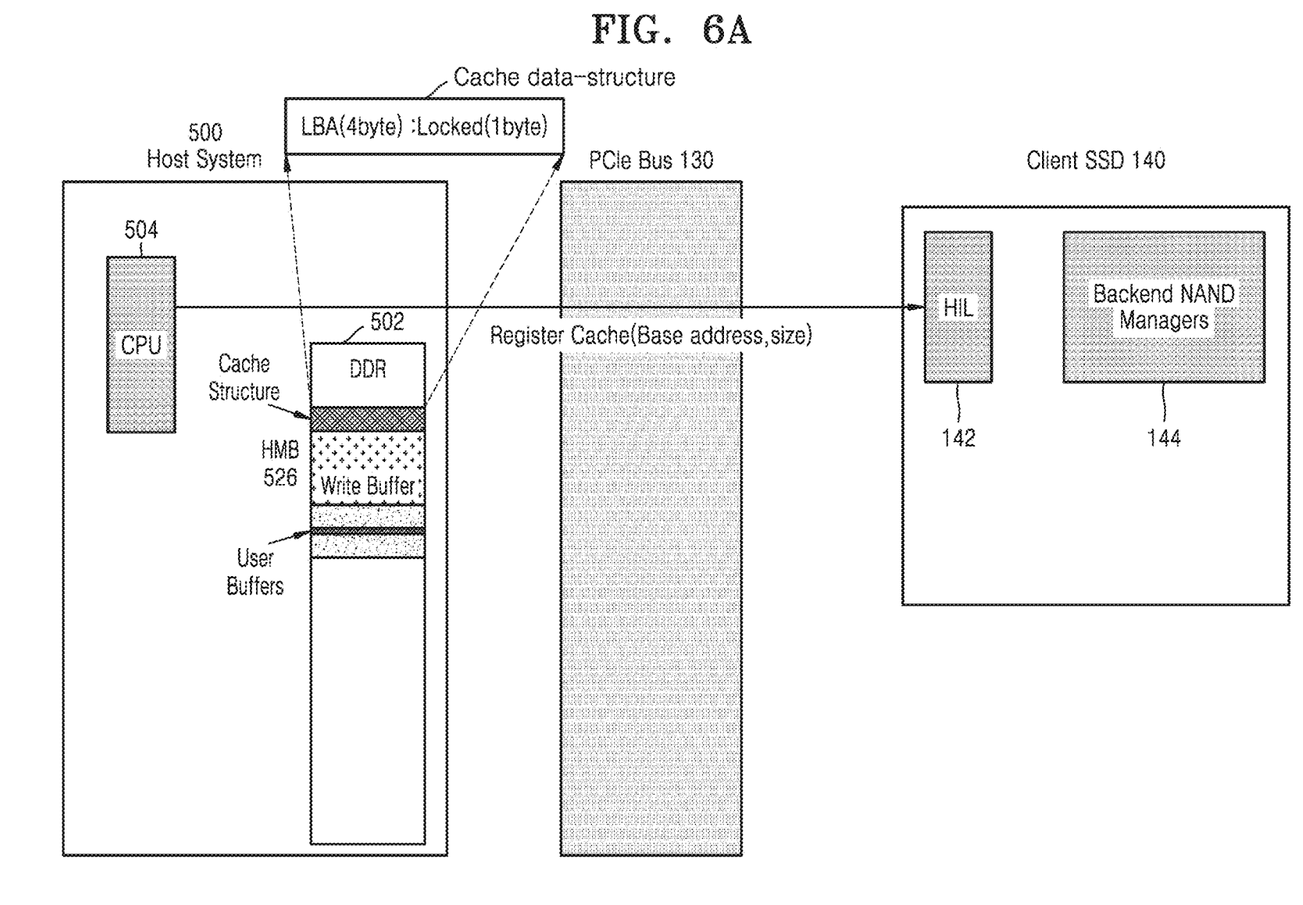
FIGS. 6A and 6B illustrate a precursor to a write/read transfer from an HMB in accordance with at least one example embodiment of the inventive concepts.
Figure 6B:
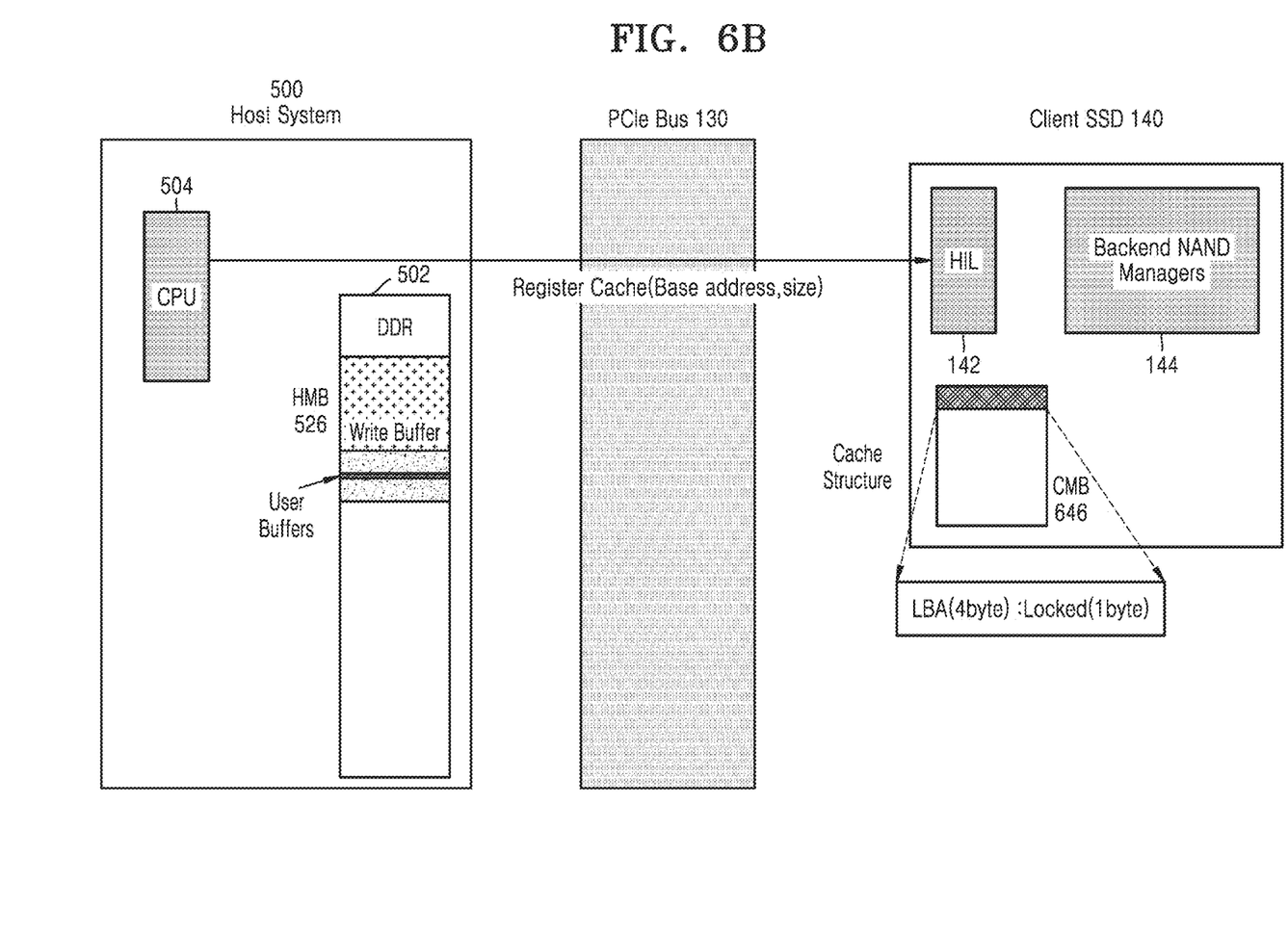

FIGS. 6A and 6B illustrate a precursor to write/read transfer from an HMB 526 in accordance with at least one example embodiment of the inventive concepts. The present description illustrates a cache data structure (e.g. of 4 bytes) to track the write buffers in the HMB 526. The cache data-structure could be stored either in the HMB 526 as shown in the FIG. 6A or controller memory buffer (CMB) 646 as shown in FIG. 6B (controller memory buffer). While the present subject matter illustrates the operation with respect to the HMB forming a part of the DDR within the host computing device, the present subject matter may be extended to cover the presence of the cache data-structure in the client management buffer (CMB) within the SSD.

As may be seen from the FIG. 6A and later from FIG. 8, the cache data-structure has an LBA entry (say N1, N2, N3) and a locked/unlocked state for each write buffer. More specifically, each entry has a logical block address (say N1, N 2, N 3) of the data currently in the write buffer and whether the buffer is currently locked/unlocked by SSD. The locked/unlocked status may be depicted through logical state 1/0.

While a backend NAND-manager 144 of the SSD 140 is accumulating programmable unit of data in write buffers of the HMB 526, the write buffers are maintained in locked-state such that the locked status may be maintained as 'logic state 1' in the cache-structure. When the write to 'NAND' is complete, the write buffers are unlocked and the 'locked status is changed to free say logic state 0. At any point, when application/driver needs to look for free write buffers, it can look for write buffers that are not locked or provided with locked status as 0.

The NAND-driver or NVMe driver of the host registers the base-address and size of the HMB 'cache structure' with the SSD with a 'new vendor unique register cache command'. Accordingly, the host device (e.g., the host system) 500 and the SSD 140 get identified to each other.

Figure 7:
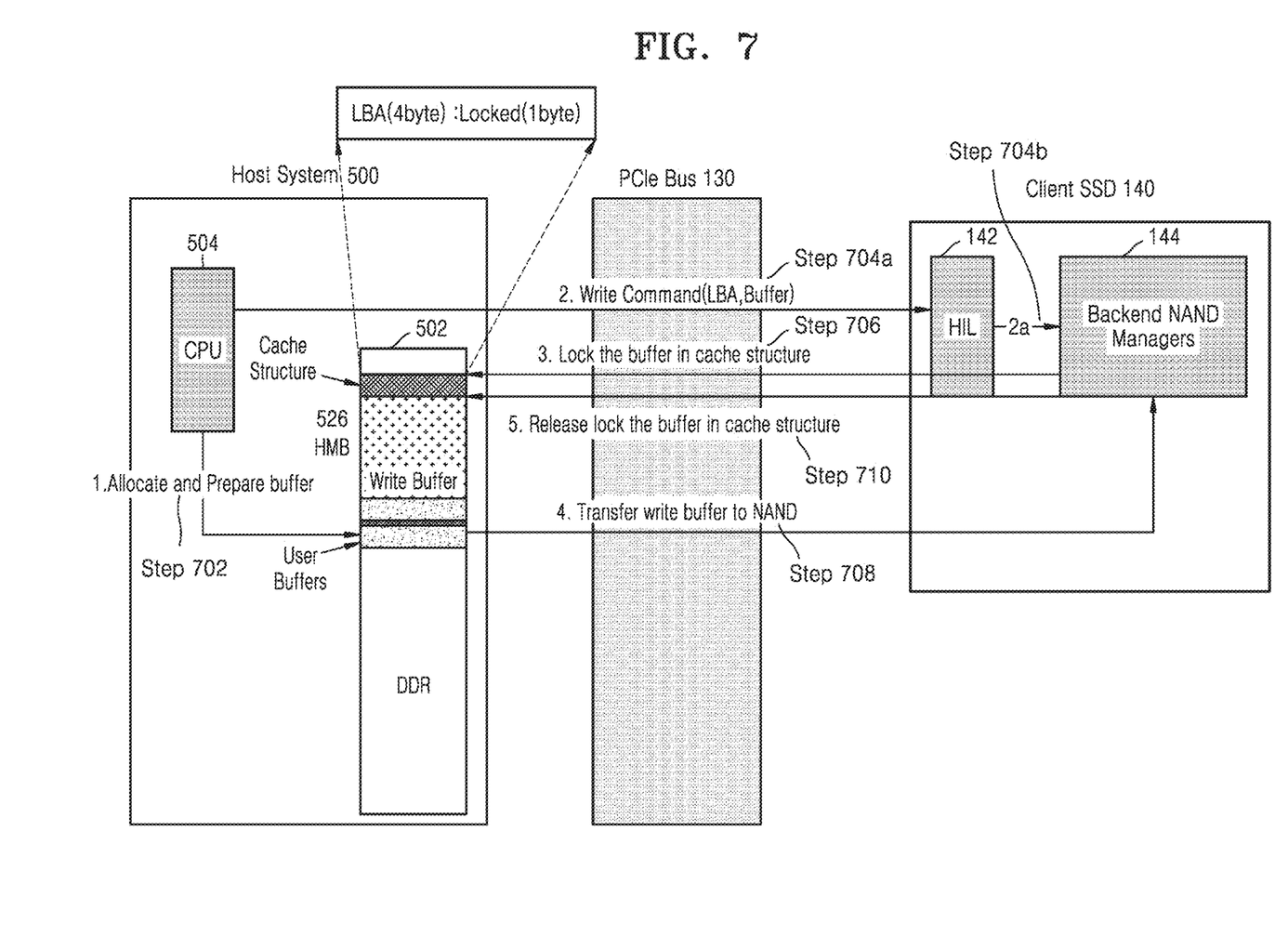
FIG. 7 illustrates a write transfer operation from an HMB, in accordance with at least one example embodiment of the inventive concepts.

FIG. 7 illustrates write transfer operation from HMB, in accordance with the embodiment of the present subject matter. More specifically, the present figure corresponds to the method steps 302 till 308 of FIG. 7.

At step 702 which corresponds to the step 302, an application being executed in the host device (e.g., the host system 500) or the driver forming a part of the operating system (OS) 510 of the host device (e.g., the host system 500) allocates buffer from the write buffers of the HMB 526 directly and initializes the buffer or the HMB 526.

At step 704a which corresponds to the step 304, the driver of the host computing device (e.g., the host system 500) or the NVMe driver issues a 'write command' to the SSD 140 providing the LBA and buffer pointers At step 704b which corresponds to the step 304, on receiving the write command from the host computing device (e.g., the host system 500), the HIL 142 forwards the write-command to a backend-NAND manager 144 or controller of the SSD. The HIL 142 checks whether there is enough data in write buffers (e.g. less than 48 KB or 96 KB) to issue NAND write.

At step 706 which corresponds to the step 304 and 306, upon finding the desired space or locating a desired buffer, the backend NAND manager 144 locks the particularly selected buffer through updating the cache-structure and pursues the write operation in the selected buffer.

At step 708 which corresponds to the step 308, once enough data (e.g. equal to 48 KB or 96 KB) has been accumulated in write buffers, the backend NAND manager fetches 144 the data for programming to NAND.

At step 710, once the programming is complete via step 708, the backend NAND manager 144 marks the otherwise 'locked' buffer as 'unlocked' or FREE. Accordingly, the stored LBA (the LPN identifier) in the NAND and earlier provided during the step 704 is deemed-invalid.

Figure 8:
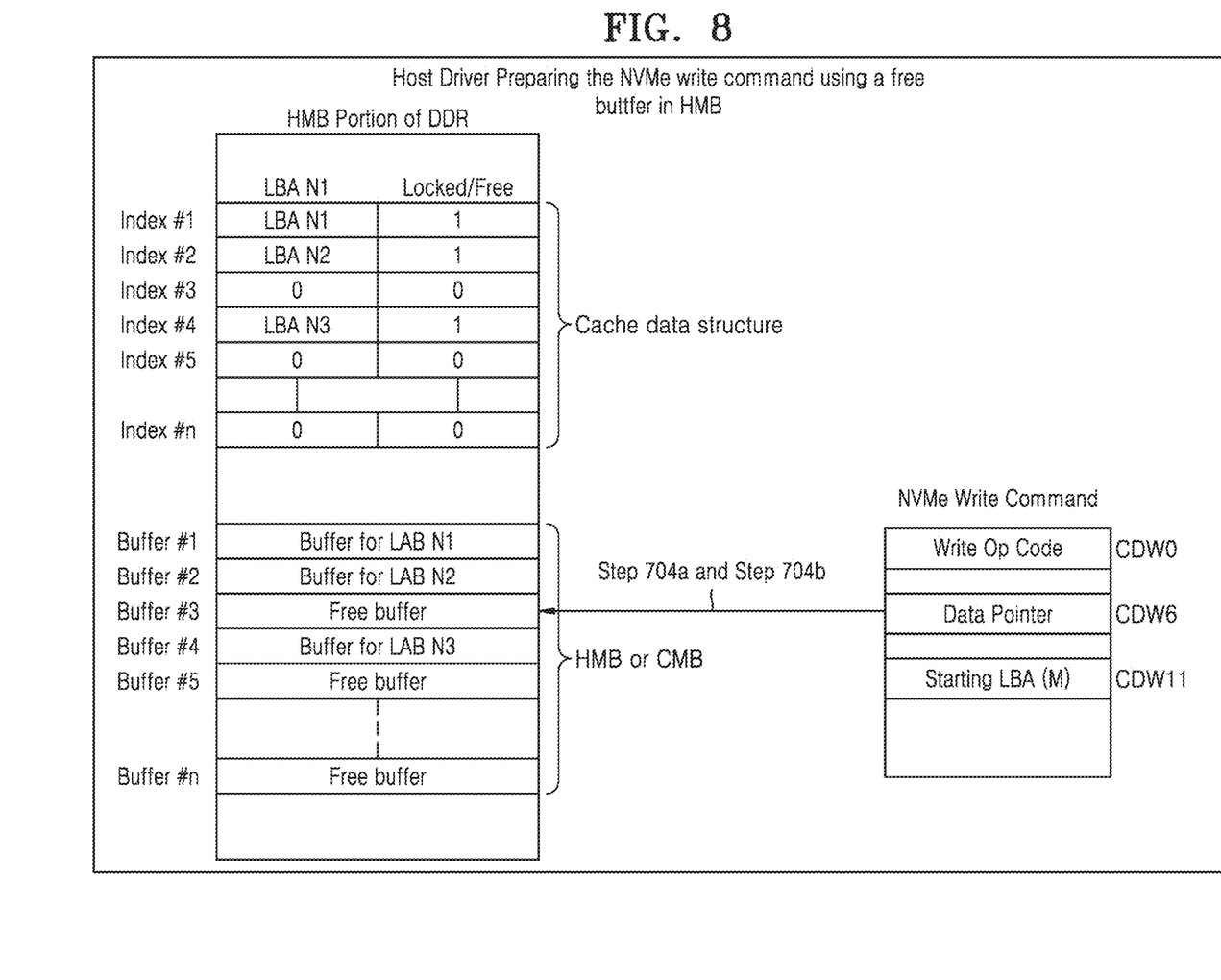
FIG. 8 illustrates a host-driver executing a write command using a free buffer in an HMB, in accordance with at least one example embodiment of the inventive concepts.

FIG. 8 illustrates a host-driver executing a write command using a free buffer in the HMB 526, in accordance with at least one example embodiment of the inventive concepts.

As depicted in FIG. 8, the "cache data structure" is an indexed table depicting the logical block address (LBA) for each occupied-buffer in the HMB 526 in form of LBA N1, N2, N3 etc. The absence of an LBA for any indexed-entry or "0" denotes an empty buffer. In addition, each of the indexed entry is associated with a corresponding "locked or Free-status" identifier denoted by the binary digit 1 or 0.

The HMB 526 in turn is a stack of buffers 1, 2, 3, 4, each of which corresponds to the indexed-entries in the data structure. Each buffer corresponds to a "4 KB" size. In an example, each of the occupied-buffers are allocated LBA N1, N2, N3 and so on based on the allocation of LBA as done in the cache data structure. However, the free-buffers in the HMB 526 remain without any allocated LBAs and are accordingly referred as "FREE" or empty-buffers ready to store data.

In operation, the NVMe write-command from the host driver or NVMe driver checks the vacancy or free buffer in HMB through the entries in cache structure held as FREE. Based on the indexed entry in the cache structure marked as "free", the NVMe write-command selects the corresponding free buffer in the HMB 526 and communicates an allocated LBA (say LBA M) to the SSD via the step 704. Based thereupon, the NVMe write-command issued form the NAND manager on behalf of SSD (via step 706) locks the buffer corresponding to the LBA M and updates the locked/ free status to '1'. Moreover, an indexed-entry of the cache-data structure is also updated with the allocated LBA M with respect to the selected buffer.

Taking into account again, the state of the art operation as depicted in FIG. 1, initially 4 KB is transferred over PCIe to the Host Memory Buffer (HMB) 526 to write 4 KB to SSD. Assuming an example PCIe speed of 3 GB/s, it takes about 1.3 is to complete the transfer of 4 KB. The writes are completed to the HMB 526, when data is transferred to HMB. Subsequently the accumulated-data is written to NAND (e.g., NAND memory of the SSD 140) by transferring the data again over the PCIe (e.g., the PCIe bus 130) from the HMB 526.

In the proposed example implementation as depicted in FIG. 7, there is no PCIe transfer when buffers are locked and being accumulated after step 706. Accordingly, in an example, at least 1.3 is of write time is saved and the latency to complete the write command is substantially reduced or, alternatively, there is effectively no latency to complete the write command. The complexity of buffer release/lock is similar when buffers are checked for busy or free from host driver or from the HIL 142.

Figure 9:
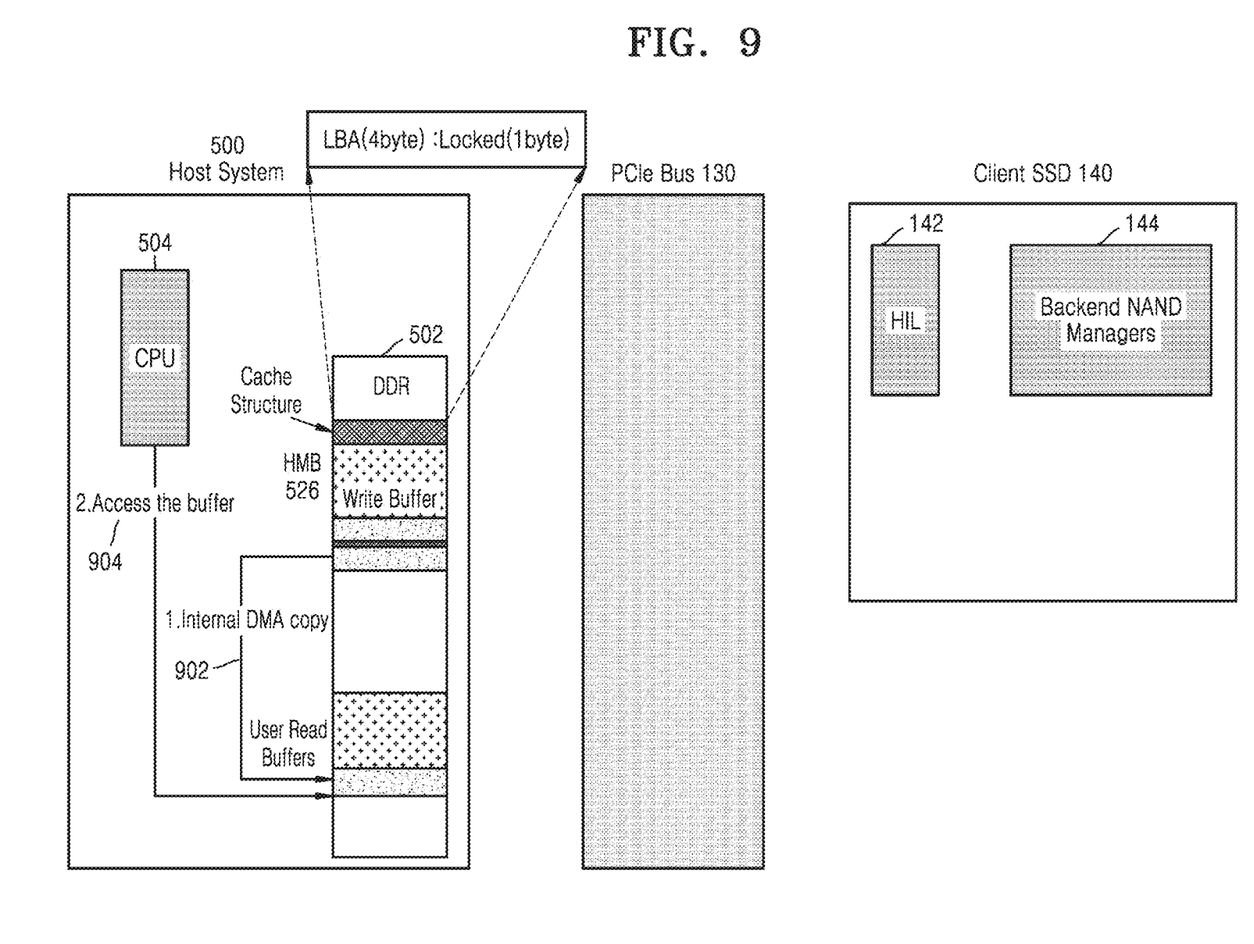
FIG. 9 illustrates a read transfer operation from an HMB, in accordance with at least some example embodiment of the inventive concepts.

FIG. 9 illustrates a read-transfer operation from the HMB 526, in accordance with at least one example embodiment of the inventive concepts. The read-transfer operation may correspond, for example, to the method steps of FIG. 4.

At step 902, the application or the driver of the host device (e.g., host system 500) allocates user's read buffers like step 702. However, prior to issuing read command to the SSD 140 as depicted in FIG. 2, the host device (e.g., host system 500) searches for the LBA in write buffers of the HMB 526 by looking-up in the cache-structure. If the LBA is available within the write buffers, an internal DMA (Direct memory access) is done within the HMB to transfer from the write buffer to the read-buffer. Accordingly, as can be seen from the figure, when transferring from the HMB 526 write buffers to read buffers, no PCIe transaction is done.

If the LBA is not available in the write buffers, read command is issued to the SSD 140.

At step 904, upon completion of the DMA and transfer of data to the read buffer, the application accesses the buffer.

Taking into account again the state of the art operation as depicted in FIG. 2, when there is a cache hit during read, there is a transfer over PCIe to the host-buffer. Assuming an example PCIe speed of 3 GB/s, it takes about 1.3 is to complete the transfer. In accordance with our proposed implementation as depicted in FIG. 9, an internal DMA transfer is performed within the host (e.g., the host system 500). In accordance with the CPU architectures that execute as a bus-speed at around 8 GB/s, a read operation according to the example illustrated in FIG. 9 may incur merely about 0.5 is to complete the transfer and thereby augments time-efficiency by about 150 percent, for example, in comparison with conventional techniques. In addition to saving data transfer over PCIe, at least some example embodiments of the inventive concepts also save (e.g., reduce) read-command transfers over a PCIe interface. A general-command overhead is about 64-bytes per SQ command and 16-byte CQ entry per command.

Overall, at least some example embodiments of the inventive concepts may provide a host-buffer to NAND transfer (i.e. a write-operation) that requires only one transfer over PCIe and provide an ability to complete a host-read operation directly from the HMB, without doing any transfer over PCIe. The same may at-least achieved by ensuring a new NVMe vendor specific command to define a data-structure (i.e. a cache data structure) for write buffer caching and registering that cache data structure with the SSD.

At least some example embodiments of the inventive concepts further include a method of doing a transfer directly from a user buffer to NAND memory (e.g., NAND memory of an SSD) and accordingly achieves only one transfer over PCIe. As a part of read operation, at least some example embodiments of the inventive concepts include executing a transfer directly from an HMB to a user buffer without any exchange of a command or data with the SSD. The proposed method improves the read and/or write performance in an HMB based DRAM-less client SSD.

While specific language has been used to describe the disclosure, any limitations arising on-account of the same are not intended. As would be apparent to a person in the art, various working modifications may be made to the method in order to implement at least some example embodiments of the inventive concepts as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

We claim:

1. A method for performing a write operation, the method comprising:
   selecting, by a host, at least a free write buffer from a plurality of write buffers of a shared memory buffer (SMB) by accessing a cache structure within the SMB for tracking the free write buffer;
   sending, by the host, at least a logical address accessed from the cache structure with respect to the selected write buffer to issue a write-command to a non-volatile memory;
   receiving a locking instruction of the selected write buffer from the non-volatile memory;
   updating a status of the selected write buffer within the cache structure based on the received locking instruction; and
   providing, to the non-volatile memory, contents of one or more locked write buffers including the selected write buffer.

2. The method of claim 1, wherein selecting of at least one free write buffer from the plurality of write buffers includes initializing the selected write buffer.

3. The method of claim 1, wherein the cache structure is a data structure for tracking a logical address of data and statuses within the plurality of write buffers, the data structure including, for each write buffer, an entry including a logical block address (LBA) of the data currently in the write buffer, and locked or unlocked state of the write buffer.

4. The method of claim 3, further comprising:

checking by a controller associated with the non-volatile memory an amount of accumulated data in the plurality of write buffers, prior to locking the selected write buffer, for scheduling the providing of the data from the plurality of write buffers including the selected write buffer into the non-volatile memory.

5. The method of claim 4, further comprising:

re-updating the cache structure to unlock the selected write buffer for further usage subsequent to completion of the providing.

6. The method of claim 5, wherein the re-updating comprises marking the logical address of data as invalid as a part of unlocking the selected write buffer.

7. The method of claim 1, wherein the providing of the contents of the one or more locked write buffers by the non-volatile memory corresponds to a single step transfer of data to the non-volatile memory from the SMB across PCIe.

8. The method of claim 1, further comprising:

registering a base address and size of the cache structure associated with the SMB with the non-volatile memory.

9. A method for performing a read operation, the method comprising:

detecting, by a host, a logical address in an indexed entry of a cache structure within a shared memory buffer (SMB), the indexed entry corresponding to at least one write buffer of the SMB; and directly accessing, by the host, the SMB to transfer data from the at least one write buffer to an allocated read buffer; and performing a read operation defined by an internal data-transfer within the SMB.

10. The method of claim 9, wherein the access of the SMB is access of a main memory defined by an internal direct memory access (DMA) operation without requiring a data-transfer across a PCIe interface.

11. The method of claim 9, further comprising:

issuing a read command from the host to a non-volatile memory in case of non-availability of the logical address in the at least one write buffer.

12. A computing system hosting a client device including a non-volatile memory, the computing system comprising:

a shared memory buffer comprising:

a plurality of write buffers configured to accumulate data for the non-volatile memory; and a cache structure within a shared memory buffer (SMB) configured to track a free write buffer out of the plurality of write buffers within the SMB; and processing circuitry configured to select, at least a free buffer from the plurality of write buffers of the SMB by accessing a cache structure within the SMB, send at least a logical address accessed from the cache structure with respect to the selected write buffer to issue a write-command to the non-volatile memory, receive a locking instruction of the selected write buffer from the non-volatile memory and thereby updating status of the selected write buffer within the cache structure, and provide, to the non-volatile memory, contents of one or more locked write buffers including the selected write buffer.

13. The system of claim 12, wherein the cache structure is a data structure configured to track logical addresses of data and statuses within the plurality of write buffers, the data structure including, for each write buffer, an entry including a logical block address (LBA) of the data currently in the write buffer; and a locked or unlocked state of the write buffer.

14. The system of claim 12, further comprising:

a controller associated with the non-volatile memory configured to check an amount of accumulated data in the plurality of write buffers, prior to locking the selected buffer, for scheduling the providing of the data from the plurality of write buffers including the selected write buffer into the non-volatile memory.

15. The system of claim 12, further comprising:

a data transfer interface configured to facilitate an exchange of data between the SMB and the non-volatile memory, wherein the providing of the contents of the one or more locked write buffers by the non-volatile memory corresponds to a single-step transfer of data across the data transfer interface.

* * * * *